(12) United States Patent
Yeh

(10) Patent No.: US 11,987,865 B2
(45) Date of Patent: May 21, 2024

(54) HIGH HARDNESS AND TEMPERATURE-RESISTANT ALLOY AND ARTICLE COMPRISING THE SAME

(71) Applicant: National Tsing Hua University, Hsinchu (TW)

(72) Inventor: Jien-Wei Yeh, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 441 days.

(21) Appl. No.: 17/351,233

(22) Filed: Jun. 18, 2021

(65) Prior Publication Data
US 2023/0127003 A1    Apr. 27, 2023

(30) Foreign Application Priority Data

Jan. 27, 2021  (TW) ................................. 110102923

(51) Int. Cl.
C22C 27/06    (2006.01)

(52) U.S. Cl.
CPC .................... C22C 27/06 (2013.01)

(58) Field of Classification Search
CPC ....... C22C 1/0433; C22C 19/00; C22C 19/03; C22C 19/05; C22C 19/051; C22C 19/052; C22C 19/053; C22C 19/055; C22C 19/058; C22C 19/07; C22C 27/06; C22C 1/045
USPC ......................................................... 420/428
See application file for complete search history.

(56) References Cited

U.S. PATENT DOCUMENTS 2,827,373 A * 3/1958 Prasse ................... C22C 19/053
                                                   420/585
5,069,872 A * 12/1991 Penoza ................... B26B 13/06
                                                   420/440

FOREIGN PATENT DOCUMENTS

| BE | 763230 A | * | 8/1971 | ............. C22C 19/05 |
| CN | 1361300 A | * | 7/2002 | |
| CN | 102423806 A | * | 4/2012 | |

(Continued)

OTHER PUBLICATIONS

ASTM International, "Standard Hardness Conversion Tables for Metals Relationship Among Brinell Hardness, Vickers Hardness, Rockwell Hardness, Superficial Hardness, Knoop Hardness, Scleroscope Hardness, and Leeb Hardness," May 2019 (Year: 2019).*

(Continued)

*Primary Examiner* — Brian D Walck
*Assistant Examiner* — Danielle Carda

(57) ABSTRACT

A high hardness and temperature-resistant alloy is disclosed, and comprises 10-40 atomic percent Co, 30-56 atomic percent Cr, 10-40 atomic percent Ni, 6-13 atomic percent C, 0-8 atomic percent Mo, and 0-8 atomic percent W. Moreover, the elemental composition of the high hardness and temperature-resistant alloy can further comprise at least one additive element, such as Pb, Sn, Ge, Si, Zn, Sb, P, B, Mg, Mn, V, Nb, Ti, Zr, Y, La, Ce, Al, Ta, Cu, and Fe. Experimental data reveal that, the high hardness and temperature-resistant alloy can still show a property of hardness greater than HV100 in 900 degrees Celsius. Therefore, experimental data have proved that the high hardness and temperature-resistant alloy has a significant potential for applications in the manufacture of hot working die metals, components (e.g., turbine blade) for high temperature applications, and devices (e.g., aeroengine) for high temperature applications.

2 Claims, 2 Drawing Sheets hot extrusion mold made of high hardness and temperature-resistant alloy (before use)

(56) References Cited

FOREIGN PATENT DOCUMENTS

JP            S6223951 A   *   1/1987

OTHER PUBLICATIONS

G. Zambelli et al. "The microstructure and crystallography of directionally solidified (Co, Ni)-Cr23C6, eutectic alloy," Journal of Materials Science, vol. 13, pp. 534-540 (Year: 1978).*

* cited by examiner hot extrusion mold made of SKD61 steel
(before use)

hot extrusion mold made of SKD61 steel
(after use)

hot extrusion mold made of high hardness and temperature-resistant alloy
(before use)

hot extrusion mold made of high hardness and temperature-resistant alloy
(after use)

HIGH HARDNESS AND TEMPERATURE-RESISTANT ALLOY AND ARTICLE COMPRISING THE SAME

BACKGROUND OF THE INVENTION

1. Field of the Invention

The present invention relates to the technology field of alloy materials, and more particularly to a high hardness and temperature-resistant alloy and an article comprising the same.

2. Description of the Prior Art

Superalloy is known as a good economic material for high temperature applications because of possessing a variety of high-temperature mechanical properties. Besides the characteristics that can be used at a high temperature above 650° C. for a long period, various types of superalloys may also exhibit other outstanding high-temperature mechanical properties, such as high corrosion resistance, high creep strength, high wear resistance, high fatigue resistance, or high oxidation resistance. Applications of the conventional superalloys are listed in the following Table (1).

TABLE (1)

| Application field | High-temperature characteristics of the applied superalloys | Products |
|---|---|---|
| Aerospace industry | Excellent high-temperature mechanical strength | Airplane engines, gas turbine engines, and engine valves |
| Energy industry | High oxidation and sulfidation resistance | Desalination plants and petrochemical pipelines |
| Electronic industry | High corrosion resistance and thermal stability | Battery housings, lead frames, and camera housings |

Nowadays, superalloys have been classified into iron-based superalloys, cobalt-based superalloys and nickel-based superalloys. The cobalt-based superalloy, commonly comprising principal elements of Co, Cr and W (or Mo) and additive elements of C, Ta, Nb, Ti, and La, is able to show good hardness of HV100 in 900 degrees Celsius. Moreover, according to different application requirements, the cobalt-based superalloy can also be processed to a casting and forging article, a powder metallurgy article, a welding wire for hard surfacing, or an alloy powder for thermal spraying or spray welding.

Material engineers skilled in development and manufacture of cobalt-based superalloys should know that, it is able to modulate the mechanical characteristics of a cobalt-based superalloy by changing the content of Mo, W and/or C to fulfill various applications. For example, the cobalt-based superalloy with high W and C content can exhibit outstanding hardness, and the cobalt-based superalloy with low C content and high Mo content shows excellent corrosion resistance.

Even if the conventional cobalt-based superalloy has the advantage of adjustable mechanical characteristics, the conventional cobalt-based superalloy is still found following drawbacks in practical applications:
  (1) There is a lack of wiggle room on the price for the conventional cobalt-based superalloy owing to expensive cost of Co; and
  (2) Resulted from mass production and heavy use of lithium-ion batteries, over-mining of Co leads the future of cobalt-based superalloy to be full of uncertainty.

From above descriptions, it is understood that there is still room for improvement in the conventional cobalt-based superalloy. In view of that, inventors of the present invention have made great efforts to make inventive research and eventually provided a high hardness and temperature-resistant alloy and an article comprising the same.

SUMMARY OF THE INVENTION

The primary objective of the present invention is to disclose a high hardness and temperature-resistant alloy, which comprises 10-40 atomic percent Co, 30-56 atomic percent Cr, 10-40 atomic percent Ni, 6-13 atomic percent C, 0-8 atomic percent Mo, and 0-8 atomic percent W. Moreover, the elemental composition of the high hardness and temperature-resistant alloy can further comprise at least one additive element, such as Pb, Sn, Ge, Si, Zn, Sb, P, B, Mg, Mn, V, Nb, Ti, Zr, Y, La, Ce, Al, Ta, Cu, and Fe. Experimental data reveal that, the high hardness and temperature-resistant alloy can still show a property of hardness greater than HV100 in 900 degrees Celsius. Therefore, experimental data have proved that the high hardness and temperature-resistant alloy has a significant potential for applications in the manufacture of hot working tool metals, components (e.g., turbine blade) for high temperature applications, and devices (e.g., aeroengine) for high temperature applications.

In order to achieve the primary objective of the present invention, inventors of the present invention provide the first embodiment of the high hardness and temperature-resistant alloy, which has a specific property of hardness greater than HV100 in 900 degrees Celsius, and has an elemental composition of $Co_w Cr_x Ni_y C_z Mo_m W_n$;
  wherein w, x, y, z, m, and n are numeric values of Co, Cr, Ni, C, Mo, and W in atomic percent, respectively; and
  wherein w, x, y, z, m, and n satisfy $10 \leq w \leq 40$, $30 \leq x \leq 56$, $10 \leq y \leq 40$, $6 \leq z \leq 13$, $m \leq 8$, and $n \leq 8$.

For achieving the objective of the present invention, inventors of the present invention provide the second embodiment of the high hardness and temperature-resistant alloy, which has a specific property of hardness greater than HV100 in 900 degrees Celsius, and has an elemental composition of $Co_w Cr_x Ni_y C_z Mo_m W_n M_s$;
  wherein M represents at least one additive element that is selected from a group consisting of Pb, Sn, Ge, Si, Zn, Sb, P, B, Mg, Mn, V, Nb, Ti, Zr, Y, La, Ce, Al, Ta, Cu, Fe;
  wherein w, x, y, z, m, n, and s are numeric values of Co, Cr, Ni, C, Mo, W, and M in atomic percent, respectively; and
  wherein w, x, y, z, m, n, and s satisfy $10 \leq w \leq 40$, $30 \leq x \leq 56$, $10 \leq y \leq 40$, $6 \leq z \leq 13$, $m \leq 8$, $n \leq 8$, and $s \leq 10$.

In practicable embodiments, the high hardness and temperature-resistant alloy according to the present invention is produced by using a manufacturing process selected from a group consisting of: vacuum arc melting process, electric resistance wire heating process, electric induction heating process, rapid solidification process, mechanical alloying process, and powder metallurgical process.

In practicable embodiments, the high hardness and temperature-resistant alloy according to the present invention is processed to be an article selected from a group consisting of powder article, wire article, welding rod, flux cored wire, plate article, and bulk article.

In practicable embodiments, the high hardness and temperature-resistant alloy is disposed on a surface of a work piece by using a processing method selected from a group consisting of: casting process, electric-arc welding process, laser welding process, plasma-arc welding process, thermal spraying process, thermal sintering process, 3D additive manufacturing process, mechanical process, and chemical process.

In practicable embodiments, the high hardness and temperature-resistant alloy is processed to be in the as-cast state or in the homogenization state.

Moreover, the present invention also discloses an article, which is selected from a group consisting of hot work tools, components for high temperature applications, and devices for high temperature applications, and is made of the high hardness and temperature-resistant alloy according to the present invention.

BRIEF DESCRIPTION OF THE DRAWINGS

The invention as well as a preferred mode of use and advantages thereof will be best understood by referring to the following detailed descriptions of an illustrative embodiment in conjunction with the accompanying drawings, wherein.

DETAILED DESCRIPTION OF THE PREFERRED EMBODIMENTS

Figure 1A:
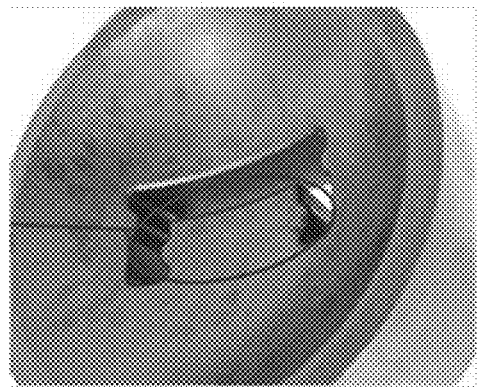
FIG. 1A shows an image of a hot extrusion mold made of SKD61 steel before use.

To more clearly describe a high hardness and temperature-resistant alloy and an article comprising the same, embodiments of the present invention will be described in detail with reference to the attached drawings hereinafter.

First Embodiment

In the first embodiment, the high hardness and temperature-resistant alloy is designed to have an elemental composition of $Co_wCr_xNi_yC_zMo_mW_n$, so as to exhibit a specific property of hardness greater than HV100 in 900 degrees Celsius. As described in more detail below, w, x, y, z, m, and n are numeric values of Co, Cr, Ni, C, Mo, and W in atomic percent, respectively. Moreover, w, x, y, z, m, and n satisfy $10 \leq w \leq 40$, $30 \leq x \leq 56$, $10 \leq y \leq 40$, $6 \leq z \leq 13$, $m \leq 8$, and $n \leq 8$. For example, the high hardness and temperature-resistant alloy is designed to comprise: 40 at % Co, 30 at % Cr, 18 at % Ni, 6 at % C, 3 at % Mo, and 3 at % W. In such case, the high hardness and temperature-resistant alloy has an elemental composition of $Co_{40}Cr_{30}Ni_{18}C_6Mo_3W_3$. That is, w=40, x=30, y=18, z=6, m=3, and n=3.

Second Embodiment

In the second embodiment, the high hardness and temperature-resistant alloy is designed to have an elemental composition of $Co_wCr_xNi_yC_zMo_mW_nM_s$, so as to exhibit a specific property of hardness greater than HV100 in 900 degrees Celsius. As described in more detail below, M represents at least one additive element that is selected from a group consisting of Pb, Sn, Ge, Si, Zn, Sb, P, B, Mg, Mn, V, Nb, Ti, Zr, Y, La, Ce, Al, Ta, Cu, Fe. On the other hand, w, x, y, z, m, n, and s are numeric values of Co, Cr, Ni, C, Mo, W, and M in atomic percent, respectively. Moreover, w, x, y, z, m, n, and s satisfy $10 \leq w \leq 40$, $30 \leq x \leq 56$, $10 \leq y \leq 40$, $6 \leq z \leq 13$, $m \leq 8$, $n \leq 8$, and $s \leq 10$. For example, the high hardness and temperature-resistant alloy is designed to comprise: 40 at % Co, 30 at % Cr, 15 at % Ni, 6 at % C, 3 at % Mo, 3 at % W, and 3 at % Nb. In such case, the high hardness and temperature-resistant alloy has an elemental composition of $Co_{40}Cr_{30}Ni_{15}C_6Mo_3W_3Nb_3$. That is, w=40, x=30, y=15, z=6, m=3, n=3, and s=3.

In other words, the high hardness and temperature-resistant alloy comprises principal elements of Co, Cr, and Ni and at least one additive element. The most important thing is that, content of Co in the high hardness and temperature-resistant alloy of the present invention is significantly less than that in the conventional cobalt-based superalloy. In the high hardness and temperature-resistant alloy of the present invention, Co, Cr and Ni construct the base phase that is a face centered cubic (FCC) structure. Moreover, in practical applications, the high hardness and temperature-resistant alloy can be processed to be an article selected from a group consisting of powder article, wire article, welding rod, flux cored wire, plate article, and bulk article.

Therefore, engineers skilled in the development and manufacture of alloys are certainly able to fabricate a specific article comprising the high hardness and temperature-resistant alloy according to the present invention, such as hot work tools (e.g., hot extrusion mold), components for high temperature applications (e.g., turbine blade), and devices for high temperature applications (e.g., aeroengine). In other words, compared to the conventional cobalt-based superalloys, the low cobalt content, high hardness and temperature-resistant alloy of the present invention can be fabricated with a low-cost and easy-to-obtain alloy composition, and thereby be applied to technology fields of aerospace industry, energy industry, chemical industry, etc.

As explained in more detail below, method for making the high hardness and temperature-resistant alloy is selected from a group consisting of: vacuum arc melting process, electric resistance wire heating process, electric induction heating process, rapid solidification process, mechanical alloying process, and powder metallurgical process. On the other hand, the high hardness and temperature-resistant alloy can be processed so as to be disposed on a surface of a work piece, and the processing method is selected from a group consisting of casting process, electric-arc welding process, laser welding process, plasma-arc welding process, thermal spraying process, thermal sintering process, 3D additive manufacturing process, mechanical process, and chemical process.

It is worth mentioning that, inventors of the present invention have completed experiments in order to prove that the high hardness and temperature-resistant alloy of the present invention can indeed be made.

First Experiment

In the first experiment, 10 samples of the high hardness and temperature-resistant alloy according to the present invention are fabricated by vacuum arc melting process. The following table (2) lists each sample's elemental composition. Moreover, homogenization process, hardness measurement, and microstructure analysis for the 10 samples are also completed, and related measurement data are recorded in the following table (2) as well.

TABLE (2)

| High hardness and temperature-resistant alloy | | As-cast state Hardness (HV) | |
|---|---|---|---|
| Samples | Elemental composition | (RT) | 900° C. |
| No. 1 | $Co_{40}Cr_{30}Ni_{18}C_6Mo_3W_3$ | 418.5 | 268.7 |
| No. 2 | $Co_{40}Cr_{30}Ni_{15}C_6Mo_3W_3Nb_3$ | 428.6 | 281.1 |
| No. 3 | $Co_{40}Cr_{30}Ni_{15}C_6Mo_3W_3Fe_3$ | 411.3 | 263.2 |
| No. 4 | $Co_{40}Cr_{30}Ni_{15}C_6Mo_3W_3Mn_3$ | 413.2 | 264.1 |
| No. 5 | $Co_{40}Cr_{33}Ni_{12}C_6Mo_3W_3Ta_3$ | 433.6 | 287.5 |
| No. 6 | $Co_{38}Cr_{33}Ni_{14}C_6Mo_3W_3P_3$ | 425.3 | 275.4 |
| No. 7 | $Co_{38}Cr_{33}Ni_{17}C_6Mo_2W_2Zr_2$ | 432.1 | 286.3 |
| No. 8 | $Co_{38}Cr_{30}Ni_{15}C_6Mo_3W_3V_3Ti_2$ | 422.3 | 275.5 |
| No. 9 | $Co_{38}Cr_{30}Ni_{15}C_6Mo_3W_1Zn_3Pb_2B_2$ | 431.2 | 281.1 |
| No. 10 | $Co_{38}Cr_{30}Ni_{15}C_6Mo_3W_1Sb_3Si_2Y_2$ | 428.9 | 277.8 |

From the forgoing table (2), it is easy to find that, the 10 samples have included the first embodiment and the second embodiment of the high hardness and temperature-resistant alloy. The most important thing is that, the high hardness and temperature-resistant alloy of the present invention can be processed to be in an as-cast state or a homogenization state, and shows a specific property of hardness greater than HV250 in 900 degrees Celsius. Moreover, experimental data have also revealed that, the 10 samples of the high hardness and temperature-resistant alloy all exhibit hardness greater than HV400.

Second Experiment

In the second experiment, 20 samples of the high hardness and temperature-resistant alloy according to the present invention are fabricated by vacuum arc melting process. The following tables (3) and (4) list each sample's elemental composition. Moreover, homogenization process, hardness measurement, and microstructure analysis for the 20 samples are also completed, and related measurement data are recorded in the following table (3) and (4).

TABLE (3)

| High hardness and temperature-resistant alloy | | As-cast state Hardness (HV) | |
|---|---|---|---|
| Samples | Elemental composition | (RT) | 900° C. |
| No. 11 | $Co_{25}Cr_{45}Ni_{15}C_6Mo_1W_8$ | 587.2 | 395.3 |
| No. 12 | $Co_{25}Cr_{40}Ni_{15}C_6Mo_3W_8Sn_3$ | 593.1 | 398.8 |
| No. 13 | $Co_{25}Cr_{40}Ni_{15}C_8Mo_3W_3Zr_3Ti_3$ | 631.6 | 423.1 |
| No. 14 | $Co_{25}Cr_{40}Ni_{15}C_8Mo_3W_3Ge_3Sb_3$ | 625.1 | 425.3 |
| No. 15 | $Co_{25}Cr_{37}Ni_{15}C_8Mo_3W_3Al_3Mg_3B_3$ | 621.8 | 416.3 |
| No. 16 | $Co_{20}Cr_{50}Ni_{10}C_9Mo_8W_3$ | 663.7 | 455.7 |
| No. 17 | $Co_{20}Cr_{42}Ni_{22}C_{13}W_3$ | 448.3 | 296.1 |
| No. 18 | $Co_{20}Cr_{45}Ni_{25}C_7Mo_3$ | 664.5 | 431.3 |
| No. 19 | $Co_{20}Cr_{45}Ni_{20}C_6Mo_1W_1Si_7$ | 675.4 | 461.8 |
| No. 20 | $Co_{20}Cr_{37}Ni_{22}C_8Mo_5W_2Ge_3Pb_3$ | 694.6 | 479.3 |

TABLE (4)

| High hardness and temperature-resistant alloy | | As-cast state Hardness (HV) | |
|---|---|---|---|
| Samples | Elemental composition | (RT) | 900° C. |
| No. 11 | $Co_{15}Cr_{27}Ni_{40}C_6Mo_6W_6$ | 731.2 | 477.6 |
| No. 12 | $Co_{15}Cr_{30}Ni38C6Mo3W3Al5$ | 758.3 | 482.1 |
| No. 13 | $Co_{15}Cr_{30}Ni_{33}C_{10}Mo_3W_3Mg_3La_3$ | 713.3 | 450.3 |
| No. 14 | $Co_{15}Cr_{36}Ni_{33}C_6Mo_3W_3Mn_2Fe_2$ | 729.3 | 456.2 |
| No. 15 | $Co_{15}Cr_{30}Ni_{33}C_8Mo_3W_3Ti_3Zn_3Y_3$ | 720.8 | 451.1 |
| No. 16 | $Co_{10}Cr_{56}Ni_{20}C_9Mo_2W_3$ | 865.3 | 512.7 |
| No. 17 | $Co_{10}Cr_{56}Ni_{15}C_6Mo_6W_1Zr_6$ | 833.2 | 498.8 |
| No. 18 | $Co_{10}Cr_{50}Ni_{17}C_{11}Mo_2W_4Sn_3Cu_3$ | 850.7 | 501.3 |
| No. 19 | $Co_{10}Cr_{37}Ni_{20}C_{13}Mo_6W_8Nb_3Ce_3$ | 583.2 | 388.1 |
| No. 20 | $Co_{10}Cr_{50}Ni_{15}C_9Mo_4W_5Zr_3V_3B_1$ | 858.7 | 506.3 |

From the forgoing table (3) and (4), it is understood that, the 20 samples of the high hardness and temperature-resistant alloy all include a specific property of hardness greater than HV250 in 900 degrees Celsius. Moreover, experimental data have also revealed that, the 20 samples of the high hardness and temperature-resistant alloy all exhibit hardness greater than HV500. On the other hand, sample No. 9 and No. 20 also exhibit outstanding lubricity and low friction coefficient because of the addition of element Pb. Moreover, sample No. 15 and No. 22 also exhibit excellent oxidation resistance because of the addition of element Al.

Herein, it is worth mentioning that, because of the high content of Cr and Ni, the high hardness and temperature-resistant alloy of the present invention exhibits more outstanding high-temperature corrosion resistance than the conventional cobalt-based superalloy. Therefore, the high hardness and temperature-resistant alloy of the present invention is suitable for being applied to technology fields of aerospace industry, energy industry, chemical industry, etc.

Third Experiment

Nowadays, linear slide rail is commonly made of carbon steel or alloy steel by using a hot extrusion equipment including a hot extrusion mold. In which, the hot extrusion mold is commonly made of SKD 61 steel. In the third experiment, the high hardness and temperature-resistant alloy of the present invention is processed to be a hot extrusion mold. Then, one hot extrusion mold made of SKD 61 steel and the other hot extrusion mold made of the high hardness and temperature-resistant alloy of the present invention are used in the manufacture of linear slide rails, separately.

Figure 1B:
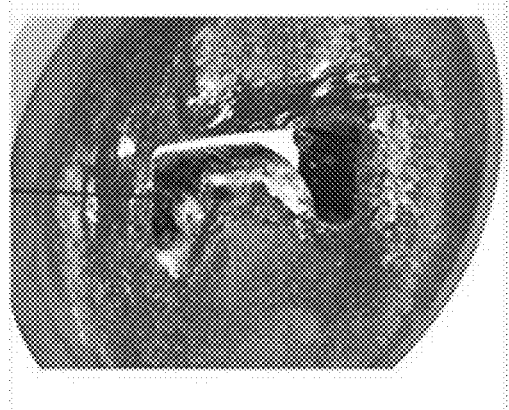
FIG. 1B shows an image of the hot extrusion mold made of SKD61 steel after use.
Figure 2A:
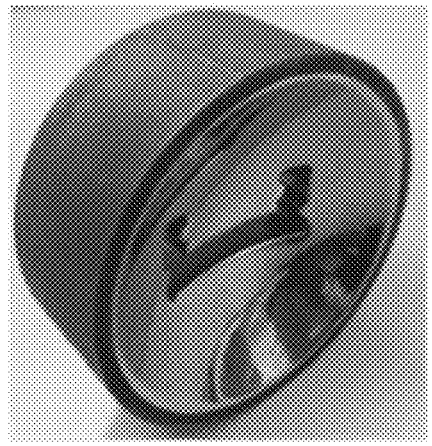
FIG. 2A shows an image of a hot extrusion mold made of a high hardness and temperature-resistant alloy before use.
Figure 2B:
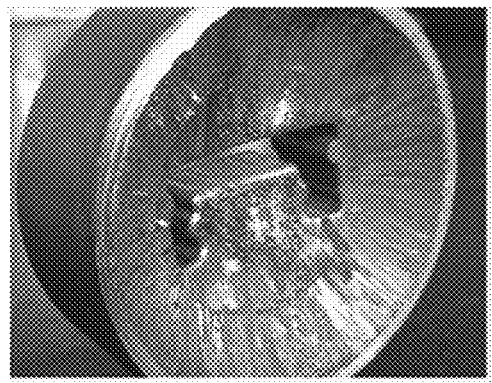
FIG. 2B shows an image of the hot extrusion mold made of a high hardness and temperature-resistant alloy after use.

FIG. 1A shows an image of a hot extrusion mold made of SKD61 steel before use, and FIG. 1B shows an image of the hot extrusion mold made of SKD61 steel after use. On the other hand, FIG. 2A shows an image of a hot extrusion mold made of the high hardness and temperature-resistant alloy before use, and FIG. 2B shows an image of the hot extrusion mold made of the high hardness and temperature-resistant alloy after use. From FIG. 1A and FIG. 1B, it is observed that, after the hot extrusion mold made of SKD61 steel is used to complete the manufacture of a linear slide rail, distortion and damages occur around the die orifice of the hot extrusion mold made of SKD61 steel. However, FIG. 2A and FIG. 2B reveal that, after the hot extrusion mold made of the high hardness and temperature-resistant is used to complete the manufacture of a linear slide rail, the integrity of the die orifice of the hot extrusion mold made of the high hardness and temperature-resistant remains unchanged. As a result, experimental data have proved that, the high hardness and temperature-resistant alloy of the present invention can be applied in the manufacture of a hot work tool (e.g., hot extrusion mold) instead of the conventional SKD61 steel.

Therefore, through above descriptions, all embodiments and their experimental data of the high hardness and temperature-resistant alloy according to the present invention have been introduced completely and clearly; in summary, the present invention includes the advantages of:

(1) The present invention discloses a high hardness and temperature-resistant alloy comprising 10-40 atomic percent Co, 30-56 atomic percent Cr, 10-40 atomic percent Ni, 6-13 atomic percent C, 0-8 atomic percent Mo, and 0-8 atomic percent W. Moreover, the elemental composition of the high hardness and temperature-resistant alloy can further comprise at least one additive element, such as Pb, Sn, Ge, Si, Zn, Sb, P, B, Mg, Mn, V, Nb, Ti, Zr, Y, La, Ce, Al, Ta, Cu, and Fe. Experimental data reveal that, the high hardness and temperature-resistant alloy can still show a property of hardness greater than HV100 in 900 degrees Celsius. According to the experimental data, it is believed that the high hardness and temperature-resistant alloy of the present invention has a significant potential for applications in the manufacture of hot working tools, components (e.g., turbine blade) for high temperature applications, and devices (e.g., aeroengine) for high temperature applications.

The above descriptions are made on embodiments of the present invention. However, the embodiments are not intended to limit the scope of the present invention, and all equivalent implementations or alterations within the spirit of the present invention still fall within the scope of the present invention.

What is claimed is:

1. A multi-element alloy, having a specific property of hardness in a range between HV250 and HV520 in 900 degrees Celsius, and consisting of:
    15 to 38 atomic percent Co;
    38 to 56 atomic percent Cr;
    20 to 29 atomic percent Ni;
    6 to 13 atomic percent C;
    0.1 to 8 atomic percent Mo;
    1 to 3 atomic percent W;
    at most 10 atomic percent M;
    wherein M comprises at least one additive element selected from a group consisting of Pb, Sn, Ge, Si, Zn, Sb, P, B, Mg, Mn, V, Nb, Ti, Zr, Y, La, Ce, Al, Ta, Cu, and Fe.

2. The multi-element alloy of claim 1, being produced by using a manufacturing method selected from a group consisting of: vacuum arc melting process, electric resistance wire heating process, electric induction heating process, rapid solidification process, mechanical alloying process, and powder metallurgical process.

* * * * *